United States Patent
Tanabe et al.

(10) Patent No.: US 10,614,706 B2
(45) Date of Patent: Apr. 7, 2020

(54) ELECTRONIC APPARATUS, CONTROL METHOD, AND NON-TRANSITORY COMPUTER-READABLE RECORDING MEDIUM

(71) Applicant: KYOCERA Corporation, Kyoto (JP)

(72) Inventors: Shigeki Tanabe, Yokohama (JP);
Hideki Morita, Yokohama (JP); Isao Masuike, Machida (JP); Shinya Saito, Kawasaki (JP); Tetsushi Wakasa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/191,716

(22) Filed: Nov. 15, 2018

(65) Prior Publication Data
US 2019/0088113 A1 Mar. 21, 2019

Related U.S. Application Data

(63) Continuation of application No. PCT/JP2017/018206, filed on May 15, 2017.

(30) Foreign Application Priority Data

May 18, 2016 (JP) ................................. 2016-099950

(51) Int. Cl.
| | |
|---|---|
| H04W 4/02 | (2018.01) |
| G08G 1/005 | (2006.01) |
| G08B 21/04 | (2006.01) |
| G01P 15/14 | (2013.01) |
| G08B 21/02 | (2006.01) |
| G08G 1/16 | (2006.01) |

(52) U.S. Cl.
CPC ............ *G08G 1/005* (2013.01); *G01P 15/14* (2013.01); *G08B 21/02* (2013.01); *G08B 21/0423* (2013.01); *G08B 21/0446* (2013.01); *G08G 1/166* (2013.01)

(58) Field of Classification Search
USPC .............. 340/903, 435, 944, 539.11, 539.13
See application file for complete search history.

(56) References Cited

U.S. PATENT DOCUMENTS

| | | | |
|---|---|---|---|
| 7,116,992 B1 | 10/2006 | Tsunehara et al. | |
| 9,536,409 B1 * | 1/2017 | Barth | H04W 4/027 |
| 9,756,474 B1 * | 9/2017 | Knas | H04L 51/20 |
| 2013/0000156 A1 | 1/2013 | Andoh | |
| 2014/0051346 A1 | 2/2014 | Li et al. | |
| 2014/0066097 A1 * | 3/2014 | Kolodziej | H04W 4/023 455/456.3 |

(Continued)

FOREIGN PATENT DOCUMENTS

| | | |
|---|---|---|
| DE | 10 2013 002 284 A1 | 8/2014 |
| DE | 10 2014 219 148 A1 | 3/2016 |

(Continued)

*Primary Examiner* — Brent Swarthout
(74) *Attorney, Agent, or Firm* — Studebaker & Brackett PC

(57) ABSTRACT

An at least one processor determines whether behavior of a user of an electronic apparatus has a high probability of inducing a traffic accident based on an acceleration measured by an accelerometer. The at least one processor issues an alert notification to the user when the at least one processor determines that the behavior of the user has the high probability of inducing the traffic accident.

10 Claims, 11 Drawing Sheets

(56) References Cited

U.S. PATENT DOCUMENTS

| | | |
|---|---|---|
| 2014/0368716 A1 | 12/2014 | Maruyama et al. |
| 2015/0035685 A1 | 2/2015 | Strickland et al. |
| 2015/0304817 A1 | 10/2015 | Yorifuji |
| 2016/0005287 A1 | 1/2016 | Yamaoka |
| 2017/0103640 A1* | 4/2017 | Deuter .................. B60Q 1/525 |

FOREIGN PATENT DOCUMENTS

| | | |
|---|---|---|
| JP | 2003-240569 A | 8/2003 |
| JP | 2005-286817 A | 10/2005 |
| JP | 2006-103602 A | 4/2006 |
| JP | 2006-175206 A | 7/2006 |
| JP | 2008-217120 A | 9/2008 |
| JP | 2011-035517 A | 2/2011 |
| JP | 2011-097394 A | 5/2011 |
| JP | 2011-138250 A | 7/2011 |
| JP | 2012-252645 A | 12/2012 |
| JP | 2013-008311 A | 1/2013 |
| JP | 2013-131143 A | 7/2013 |
| JP | 2013-137606 A | 7/2013 |
| JP | 2013-239853 A | 11/2013 |
| JP | 2014-017865 A | 1/2014 |
| JP | 2014-191667 A | 10/2014 |
| JP | 2015-219641 A | 12/2015 |
| WO | 2001/077621 A1 | 10/2001 |
| WO | 2010/026513 A1 | 3/2010 |
| WO | 2011/114977 A1 | 9/2011 |

* cited by examiner

ELECTRONIC APPARATUS, CONTROL METHOD, AND NON-TRANSITORY COMPUTER-READABLE RECORDING MEDIUM

CROSS-REFERENCE TO RELATED APPLICATION

The present application is a continuation based on PCT Application No. PCT/JP2017/018206 filed on May 15, 2017, which claims the benefit of Japanese Application No. 2016-099950, filed on May 18, 2016. PCT Application No. PCT/JP2017/018206 is entitled "ELECTRONIC DEVICE, CONTROL METHOD, AND CONTROL PROGRAM", and Japanese Application No. 2016-099950 is entitled "ELECTRONIC APPARATUS, CONTROL METHOD. AND CONTROL PROGRAM". The contents of which are incorporated by reference herein in their entirety.

FIELD

Embodiments of the present disclosure generally relate to a notification technology.

BACKGROUND

Hitherto, there has been an electronic apparatus that notifies the electronic apparatus or another apparatus at a predetermined timing.

SUMMARY

An electronic apparatus, a control method, and a non-transitory computer-readable recording medium are disclosed. In one embodiment, an electronic apparatus comprises an at least one processor configured to make a determination based on an acceleration measured by an accelerometer. The determination is for determining whether behavior of a user of the electronic apparatus has a high probability of inducing a traffic accident. The at least one processor issues an alert notification to the user when the at least one processor determines that the behavior of the user has the high probability of inducing the traffic accident.

In one embodiment, a control method is a control method executed by an electronic apparatus. The control method comprises a step of determining whether behavior of a user of the electronic apparatus has a high probability of inducing a traffic accident based on acceleration measured by an accelerometer. The control method comprises a step of issuing an alert notification to the user if determination is made that the behavior has a high probability of inducing the traffic accident.

In one embodiment, a non-transitory computer-readable recording medium stores a control program in an electronic apparatus to execute the following processes. The control program in an electronic apparatus executes a process of determining whether behavior of a user of the electronic apparatus has a high probability of inducing a traffic accident based on acceleration measured by an accelerometer. The control program in the electronic apparatus executes a process of issuing an alert notification to the user if determination is made that the behavior has a high probability of inducing the traffic accident.

DETAILED DESCRIPTION

A plurality of embodiments for implementing an electronic apparatus, a control method, and a control program according to the present disclosure will be described in detail with reference to the drawings.

In the following, description will be given of a portable electronic apparatus as one example of the electronic apparatus according to the present disclosure. The portable electronic apparatus is a smartphone, for example. As long as the portable electronic apparatus is an electronic apparatus that can be carried by a user and has a function of measuring acceleration and air pressure, the portable electronic apparatus may be an apparatus other than a smartphone. For example, the portable electronic apparatus may be an apparatus such as a mobile phone, a tablet, a portable personal computer, a digital camera, a media player, an electronic book reader, a navigator, a pedometer, an activity meter, a head mounted display, hearing aids, earphones, and a gaming machine.

Figure 1:
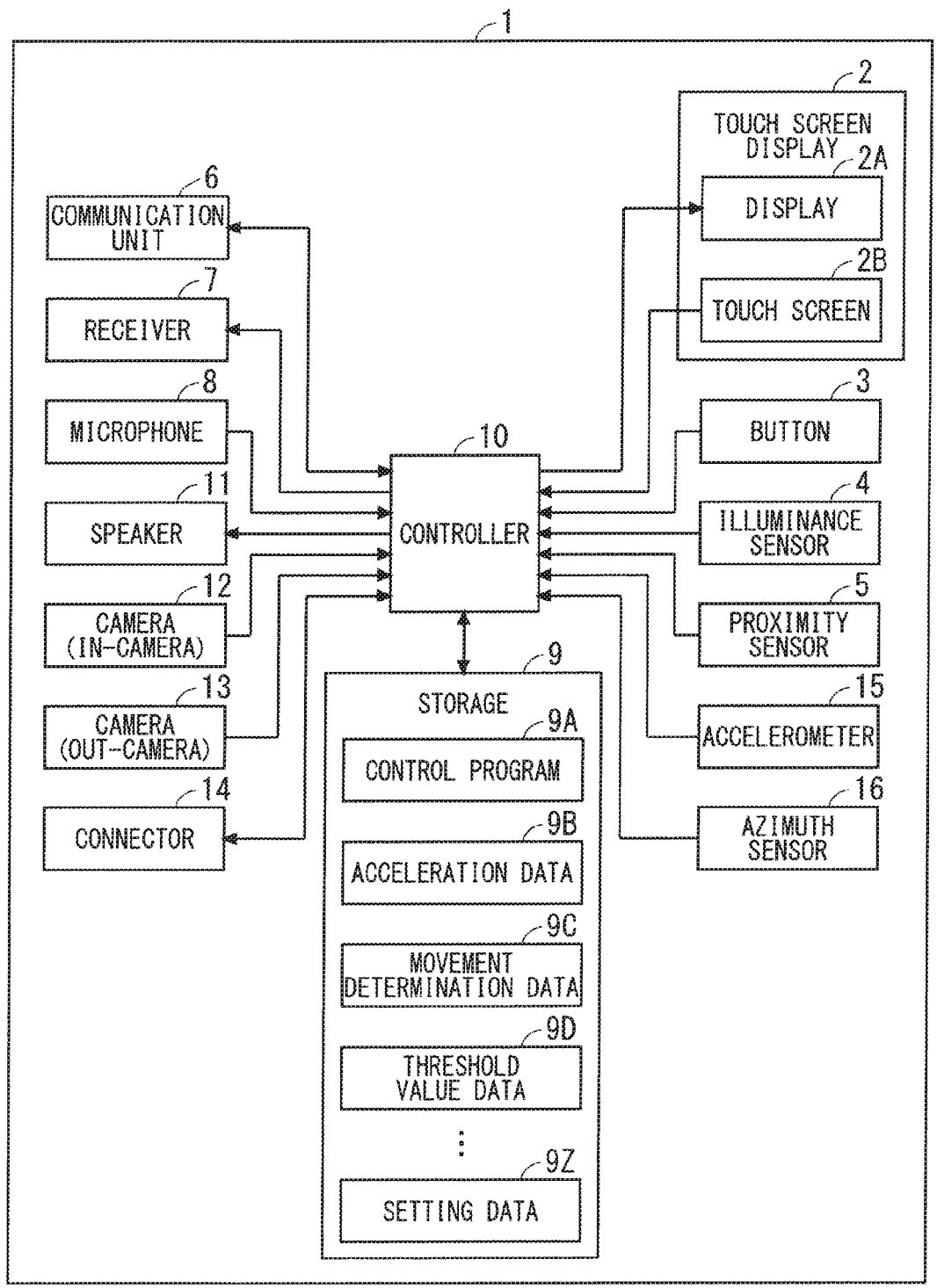
FIG. 1 illustrates a block diagram showing one example of a functional configuration of a smartphone.

FIG. 1 illustrates a block diagram showing one example of a functional configuration of a smartphone 1 according to one embodiment. In the description below, the same reference symbols may be given to like components. In the description below, overlapping description may be omitted. In the description below, the smartphone 1 may be referred to as a "subject apparatus."

As illustrated in FIG. 1, the smartphone 1 comprises a touch screen display 2, a button 3, an illuminance sensor 4, a proximity sensor 5, a communication unit 6, a receiver 7, a microphone 8, a storage 9, a controller 10, a speaker 11, a camera 12, a camera 13, a connector 14, an accelerometer 15, and an azimuth sensor 16.

The touch screen display 2 comprises a display 2A and a touch screen 2B. The display 2A and the touch screen 2B may be, for example, located in an overlapping manner, located side by side, or located away from each other. If the display 2A and the touch screen 2B are located in an overlapping manner, for example, one or more sides of the display 2A need not extend along any side of the touch screen 2B.

The display 2A comprises a display device such as a liquid crystal display (LCD), an organic electro-luminescence display (OELD), and an inorganic electro-luminescence display (IELD). The display 2A can display an object such as letters, images, symbols, and figures in a screen. The screen including the object displayed by the display 2A includes a screen referred to as a lock screen, a screen referred to as a home screen, and an application screen displayed during execution of an application. The home screen may also be referred to as a desktop, a standby screen, an idle screen, a standard screen, an application list screen, and a launcher screen.

The touch screen 2B can detect contact or proximity of a finger, a pen, a stylus pen, or the like on or toward the touch screen 2B. When fingers, a pen, a stylus pen, or the like comes in contact with or comes closer to the touch screen 2B, the touch screen 2B can detect the position thereof on the touch screen 2B. In the description below, the position where fingers, a pen, a stylus pen, or the like detected by the touch screen 2B comes in contact with or comes closer to the touch screen 2B is referred to as a "detection position." The touch screen 2B can notify the controller 10 about the contact or the proximity of a finger on or toward the touch screen 2B together with the detection position. The touch screen 2B may notify the controller 10 about a detection position, to thereby notify the controller 10 about detection of contact or proximity. The touch screen display 2 comprising the touch screen 2B can execute operation that can be performed by the touch screen 2B. In other words, the touch screen display 2 may perform operation performed by the touch screen 2B.

The controller 10 can distinguish types of gesture based on at least one of contact or proximity detected by the touch screen 2B, a detection position, change in a detection position, duration of contact or proximity, interval of detections of contact or proximity, and the number of times of detection of contact. The smartphone 1 comprising the controller 10 can execute operation that can be performed by the controller 10. In other words, the smartphone 1 may perform operation performed by the controller 10. The gesture is operation performed on the touch screen 2B using a finger. Operation performed on the touch screen 2B may be performed on the touch screen display 2 comprising the touch screen 2B. Examples of the gesture distinguished by the controller 10 via the touch screen 2B include, but not only limited to, touch, long touch, release, swipe, tap, double tap, long tap, drag, flick, pinch-in, and pinch-out.

A detection method of the touch screen 2B may be any method, such as an electrostatic capacitance method, a resistance film method, a surface acoustic wave method, an infrared method, and a load detection method.

The button 3 can receive an operation input from the user. Regarding the number of buttons 3, either of a single button 3 or a plurality of buttons 3 is acceptable. The button 3 is one example of an operation button.

The illuminance sensor 4 can detect illuminance. Illuminance is a value of a flux of light incident on a unit area in a measurement area of the illuminance sensor 4. The illuminance sensor 4 is, for example, used for adjusting brightness of the display 2A.

The proximity sensor 5 can detect presence of a nearby object in a touchless manner. The proximity sensor 5 can detect presence of an object based on change in a magnetic field, change in a returning time period of a reflected wave of an ultrasonic wave, or the like. The proximity sensor 5 can detect, for example, approach between the display 2A and a face. The illuminance sensor 4 and the proximity sensor 5 may be formed as one sensor. The illuminance sensor 4 may also be used as a proximity sensor.

The communication unit 6 can wirelessly communicate. Wireless communication standards supported by the communication unit 6 include a communication standard for a cellular phone, such as 2G, 3G, 4G, and 5G, and a communication standard for short-range wireless communication. Examples of the communication standard for a cellular phone include Long Term Evolution (LTE), Wideband Code Division Multiple Access (W-CDMA), Worldwide Interoperability for Microwave Access (trademark) (WiMAX), CDMA2000, Personal Digital Cellular (PDC), Global System for Mobile Communications (trademark) (GSM), and Personal Handy-phone System (PHS). Examples of the communication standard for short-range wireless communication include IEEE802.11, Bluetooth (trademark), Infrared Data Association (IrDA), Near Field Communication (NFC), and Wireless Personal Area Network (WPAN). The communication standard for WPAN includes, for example, ZigBee (trademark). The communication unit 6 may support a single or a plurality of the communication standards described above. In one example of one embodiment, the communication unit 6 can further support a plurality of communication standards for enabling communication with a roadside unit built at the vicinity of an intersection. In one example of one embodiment, the communication unit 6 can receive a radio wave sent from a roadside unit, which sends a radio wave that can be received by apparatus present within a predetermined communication area including an intersection.

The receiver 7 can output a sound signal sent from the controller 10 as sound. The receiver 7 can, for example, output sound of a video and sound of music played by the smartphone 1, and a voice of a calling partner. The microphone 8 can convert an incoming voice of the user etc. into a sound signal, and can send the converted signal to the controller 10.

The storage 9 can store a program and data. The storage 9 may be used as a working area where processing results of the controller 10 are temporarily stored. The storage 9 may comprise any non-transitory storage medium such as a semiconductor storage medium and a magnetic storage medium. The storage 9 may comprise a plurality of types of storage media. The storage 9 may comprise a combination of a storage medium such as a memory card, an optical disc, and a magneto-optical disk, and a reader for the storage medium. The storage 9 may comprise a storage device such as random access memory (RAM) that is used as a temporary storage area.

Programs stored in the storage 9 include applications to be executed in the foreground or the background, and a support program (not shown) that supports operation of the applications. When an application is executed in the foreground, for example, the application can display a screen relating to the application in the display 2A. Examples of the support program include an OS. The programs may be installed in the storage 9 via wireless communication performed by the communication unit 6 or via a non-transitory storage medium.

The storage 9 can store a control program 9A, acceleration data 9B, movement determination data 9C, threshold value data 9D, setting data 9Z, etc. When providing various functions, the control program 9A can cooperate with various applications. The control program 9A may cooperate with a cloud storage via the communication unit 6, and may access files and data stored in the cloud storage. The cloud storage may store a part or all of the programs and data stored in the storage 9.

The control program 9A can provide functions related to the operation of the smartphone 1. In one example of one embodiment, the control program 9A can provide each of the functions below.

The control program 9A can provide a function of determining whether behavior of the user of the subject apparatus is behavior having high probability of inducing a traffic accident, based on acceleration as a detection result of the accelerometer 15. Specifically, the control program 9A can measure vibration and movement that affects the subject apparatus, based on direction and magnitude of acceleration as a detection result of the accelerometer 15. The control program 9A can determine whether the user of the subject apparatus is walking by comparing a measurement result of measured vibration and movement with the movement determination data 9C. If the control program 9A determines that the user is walking, the control program 9A can start monitoring the acceleration. If the monitored acceleration exceeds a predetermined threshold value that is contained in the threshold value data 9D, the control program 9A can determine that the behavior of the user is behavior having high probability of inducing a traffic accident. The control program 9A can use average walking acceleration of the user as the predetermined threshold value, for example. In this case, if the monitored acceleration exceeds the average walking acceleration of the user, the control program 9A can determine that the behavior of the user is behavior having high probability of inducing a traffic accident. Determining whether the monitored acceleration exceeds the average walking acceleration of the user with the aid of the function provided by the control program 9A, sudden running behavior of the user can be recognized, for example.

Alternatively, the control program 9A can determine whether the user of the subject apparatus is stopping by comparing a measurement result of vibration and movement that affects the subject apparatus with the movement determination data 9C. If the control program 9A determines that the user is stopping, the control program 9A can start monitoring the acceleration. Further, similarly to the case of determining that the user is walking, if the monitored acceleration exceeds a predetermined threshold value contained in the threshold value data 9D, the control program 9A can determine that the behavior of the user is behavior having high probability of inducing a traffic accident.

If the control program 9A determines that the behavior of the user of the subject apparatus is behavior having high probability of inducing a traffic accident, the control program 9A can provide a function of issuing an alert notification to the user.

The control program 9A can also determine whether the user of the subject apparatus is walking or stopping by using, in place of or as an auxiliary of the accelerometer 15, at least one of the azimuth sensor 16, the microphone 8, the camera 12, the camera 13, a GPS receiver (not shown), etc.

The acceleration data 9B includes a value of acceleration acquired by the accelerometer 15. The acceleration data 9B includes direction and magnitude of acceleration acquired by the accelerometer 15. The acceleration data 9B may include all measurement results measured by the accelerometer 15.

The movement determination data 9C includes, for example, information of determination conditions that is used for determining a movement state of the user of the smartphone 1. The information of determination conditions may include direction and magnitude of acceleration that affects the subject apparatus, an acceleration pattern consisting of time-series changes of direction and magnitude of acceleration, or a combined vector obtained by combining acceleration in thee axes of an X-axis, a Y-axis, and a Z-axis. The information of determination conditions includes at least information for determining, based on the detection result of the accelerometer 15, whether the user is walking or stopping.

The threshold value data 9D includes information of a predetermined threshold value that is used for determining whether behavior of the user is behavior having high probability of inducing a traffic accident. The threshold value data 9D includes, as the information of the predetermined threshold value, information of average walking acceleration of the user of the subject apparatus that is measured in advance, for example.

The setting data 9Z includes information of various settings about operation of the smartphone 1. In one embodiment, the setting data 9Z includes information of a manner of issuing an alert notification that is to be implemented when determination is made that the behavior of the user is behavior having high probability of inducing a traffic accident. The manner of issuing a notification may include a pattern using at least one of sound, image, light, vibration, etc.

The controller 10 comprises at least one processor for providing control and processing capability to implement various functions as described in detail below.

In accordance with various embodiments, the at least one processor may be implemented as a single integrated circuit (IC) or as multiple communicatively coupled integrated circuits and/or discrete circuits. It is appreciated that the at least one processor can be implemented in accordance with various known technologies.

In one embodiment, the processor comprises one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In this example, the controller 10 comprises an arithmetic processing unit. The arithmetic processing unit comprises, but not only limited to, a central processing unit (CPU), a system-on-a-chip (SoC), a micro control unit (MCU), a field-programmable gate array (FPGA), and a coprocessor, for example. The controller 10 can integrally control operation of the smartphone 1 so as to implement various functions. The controller 10 is one example of a controller.

The controller 10 can execute a command that is contained in a program stored in the storage 9, simultaneously with referring to data stored in the storage 9 as necessary. Then, the controller 10 can control a function unit in accordance with the data or the command, and can thereby implement various functions. The function unit comprises, but not only limited to, the display 2A, the communication unit 6, the microphone 8, and the speaker 11, for example. The controller 10 may change control depending on a detection result of a detector. The detector comprises, but not only limited to, the touch screen 2B, the button 3, the illuminance sensor 4, the proximity sensor 5, the microphone 8, the camera 12, the camera 13, the accelerometer 15, and the azimuth sensor 16, for example.

Through execution of the control program 9A, the controller 10 can implement processing of determining whether behavior of the user of the subject apparatus is behavior having high probability of inducing a traffic accident based on acceleration as a detection result of the accelerometer 15. Specifically, the controller 10 can measure vibration and movement that affects the subject apparatus, based on direction and magnitude of acceleration as a detection result of the accelerometer 15. The controller 10 can determine whether the user of the subject apparatus is walking by comparing a measurement result of measured vibration and movement with the movement determination data 9C. If the controller 10 determines that the user is walking, the controller 10 can start monitoring the acceleration. If the monitored acceleration exceeds a predetermined threshold value that is contained in the threshold value data 9D, the controller 10 can determine that the behavior of the user is behavior having high probability of inducing a traffic accident. For example, if the monitored acceleration exceeds average walking acceleration of the user, the controller 10 can determine that the behavior of the user is behavior having high probability of inducing a traffic accident.

Alternatively, the controller 10 can determine whether the user of the subject apparatus is stopping by comparing a measurement result of vibration and movement that affects the subject apparatus with the movement determination data 9C. In this case, if the controller 10 determines that the user is stopping, the controller 10 can start monitoring the acceleration. Further, similarly to the case of determining that the user is walking, if the monitored acceleration exceeds a predetermined threshold value contained in the threshold value data 9D, the controller 10 can determine that the behavior of the user is behavior having high probability of inducing a traffic accident.

If the controller 10 determines that the behavior of the user is behavior having high probability of inducing a traffic accident, the controller 10 can issue an alert notification to the user.

The speaker 11 can output a sound signal sent from the controller 10 as sound. The speaker 11 is, for example, used for outputting a ringtone and music. One of the receiver 7 and the speaker 11 may perform the function of the other.

The camera 12 and the camera 13 can convert their capturing image into an electrical signal. The camera 12 is an in-camera that captures an image of an object that faces the display 2A. The camera 13 is an out-camera that captures an image of an object that faces the opposite surface of the display 2A. The camera 12 and the camera 13 may be implemented in the smartphone 1 as a camera unit in a functionally and physically integrated state that can be used by switching the in-camera and the out-camera.

The connector 14 is a terminal to which another device is connected. The connector 14 may be a general terminal such as Universal Serial Bus (USB). High-Definition Multimedia Interface (trademark) (HDMI), Light Peak (Thunderbolt (trademark)), and an earphone-microphone connector. The connector 14 may be a dedicated terminal such as a dock connector. Examples of a device to be connected to the connector 14 include, but not only limited to, an external storage, a speaker, and a communication device.

The accelerometer 15 can measure direction and magnitude of acceleration that affects the smartphone 1. The accelerometer 15 is one example of an accelerometer. The azimuth sensor 16 can, for example, detect a direction of geomagnetism, and can measure a direction (azimuth) of the smartphone 1 based on the direction of geomagnetism.

The smartphone 1 may comprise a GPS receiver and a vibrator, in addition to each function unit of the above. The GPS receiver can receive radio wave signals in a predetermined frequency band from GPS satellites. The GPS receiver can perform demodulation processing on incoming radio wave signals, and can send out the processed signals to the controller 10. The GPS receiver can assist with processing of calculating the current position of the smartphone 1. The smartphone 1 may comprise a receiver that can receive signals from positioning artificial satellites other than GPS satellites, and may thereby execute processing of calculating the current position. The vibrator can vibrate a part of or the entire smartphone 1. The vibrator comprises a piezoelectric element or an eccentric motor, for example, in order to generate vibration. In the smartphone 1, a function unit such as a battery that is naturally used for maintaining the functions of the smartphone 1 as well as a controller that is naturally used for implementing control of the smartphone 1 is implemented. Note that, in order to determine the current position of the subject apparatus, a receiver for radio wave signals emitted from positioning artificial satellites other than GPS satellites may be implemented in the smartphone 1. The positioning artificial satellites other than GPS satellites include, for example, artificial satellites of Global Navigation Satellite System (GLONASS), artificial satellites of Indian Regional Navigational Satellite System (IRNSS), artificial satellites of COMPASS, and artificial satellites of GALILEO.

Figure 2:
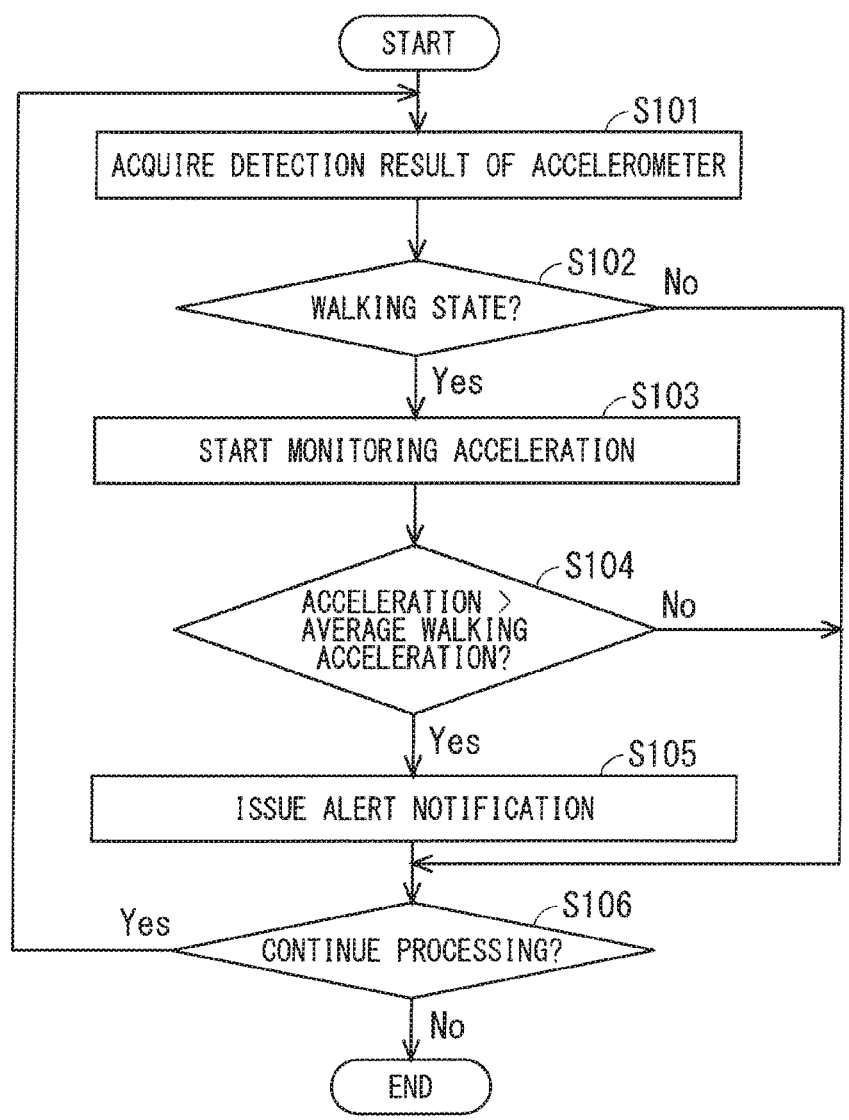
FIG. 2 illustrates a flowchart showing one example of a flow of processing executed by the smartphone.
Figure 3:
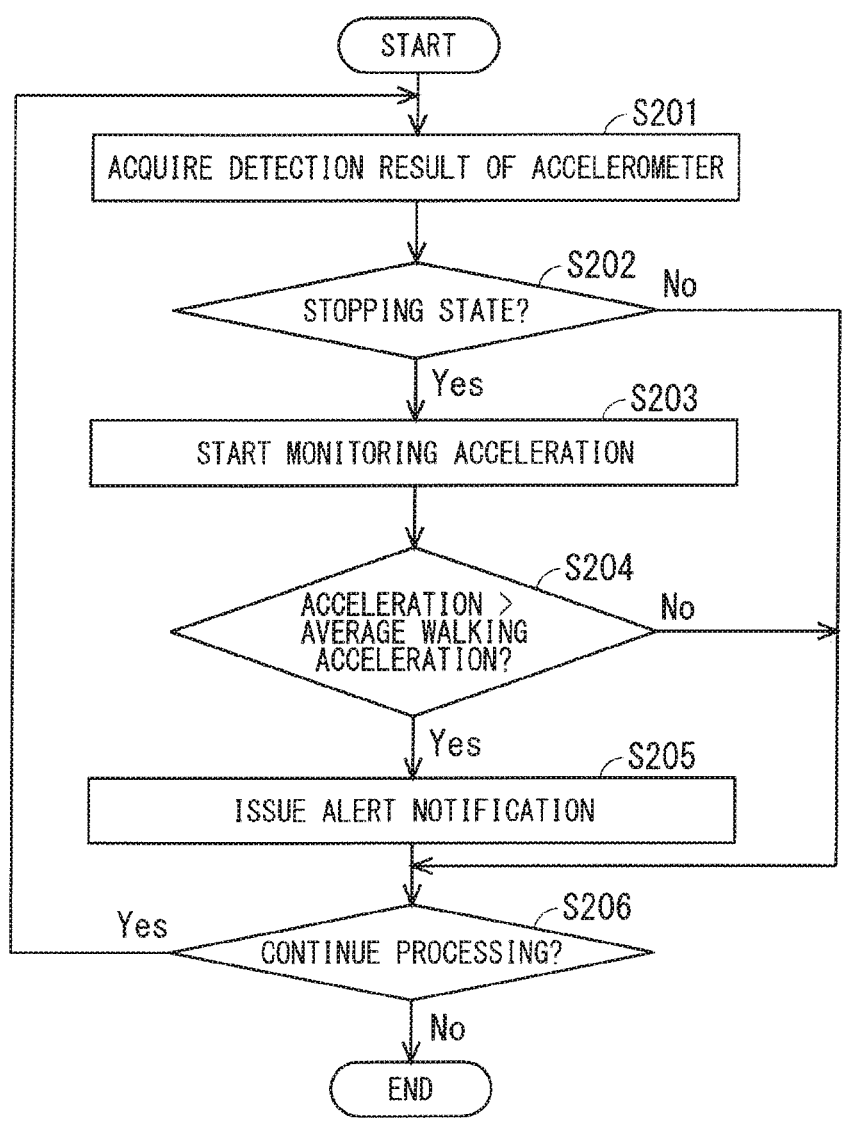
FIG. 3 illustrates a flowchart showing one example of a flow of processing executed by the smartphone.

Referring to FIG. 2 and FIG. 3, a flow of processing executed by the smartphone 1 according to one embodiment will be described. FIG. 2 and FIG. 3 each illustrate a flowchart showing one example of a flow of processing executed by the smartphone according to one embodiment. The processing illustrated in FIG. 2 and FIG. 3 is implemented by the controller 10 executing the control program 9A stored in the storage 9.

Referring to FIG. 2, description will be given of one example. Specifically, if the user is walking, the smartphone 1 starts monitoring acceleration that affects the subject apparatus. The smartphone 1 then determines whether the monitored acceleration exceeds average walking acceleration, and thereby determines whether behavior of the user has high probability of inducing a traffic accident.

As illustrated in FIG. 2, the controller 10 acquires a detection result of the accelerometer 15 (Step S101).

Subsequently, the controller 10 determines whether the user of the smartphone 1 is walking based on the detection result of the accelerometer 15 (Step S102).

If the user is walking as a result of the determination (Step S102, Yes), the controller 10 starts monitoring the acceleration as the detection result of the accelerometer 15 (Step S103).

Subsequently, the controller 10 determines whether the monitored acceleration exceeds average walking acceleration of the user of the subject apparatus (Step S104).

If the monitored acceleration exceeds the average walking acceleration as a result of the determination (Step S104, Yes), the controller 10 issues an alert notification to the user of the subject apparatus (Step S105).

Subsequently, the controller 10 determines whether to continue the processing (Step S106).

If the processing is to be continued as a result of the determination (Step S106, Yes), the controller 10 returns to the processing procedure of Step S101 above. In contrast, if the processing is not to be continued as a result of the determination (Step S106, No), the controller 10 ends the processing illustrated in FIG. 2.

If the monitored acceleration does not exceed the average walking acceleration as a result of the determination in Step S104 above (Step S104, No), the controller 10 proceeds to the determination of Step S106 above.

If the user is not walking as a result of the determination in Step S102 above (Step S102, No), the controller 10 proceeds to the determination of Step S106 above.

Referring to FIG. 3, description will be given of one example. Specifically, if the user is stopping, the smartphone 1 starts monitoring acceleration that affects the subject apparatus. The smartphone 1 then determines whether the monitored acceleration exceeds average walking acceleration, and thereby determines whether behavior of the user has high probability of inducing a traffic accident.

As illustrated in FIG. 3, the controller 10 acquires a detection result of the accelerometer 15 (Step S201).

Subsequently, the controller 10 determines whether the user of the smartphone 1 is stopping based on the detection result of the accelerometer 15 (Step S202).

If the user is stopping as a result of the determination (Step S202. Yes), the controller 10 starts monitoring the acceleration as the detection result of the accelerometer 15 (Step S203).

Subsequently, the controller 10 determines whether the monitored acceleration exceeds average walking acceleration of the user of the subject apparatus (Step S204).

If the monitored acceleration exceeds the average walking acceleration as a result of the determination (Step S204, Yes), the controller 10 issues an alert notification to the user of the subject apparatus (Step S205).

Subsequently, the controller 10 determines whether to continue the processing (Step S206).

If the processing is to be continued as a result of the determination (Step S206, Yes), the controller 10 returns to the processing procedure of Step S201 above. In contrast, if the processing is not to be continued as a result of the determination (Step S206, No), the controller 10 ends the processing illustrated in FIG. 3.

If the monitored acceleration does not exceed the average walking acceleration as a result of the determination in Step S204 above (Step S204, No), the controller 10 proceeds to the determination of Step S206 above.

If the user is not stopping as a result of the determination in Step S202 above (Step S202, No), the controller 10 proceeds to the determination of Step S206 above.

In one embodiment of the above, the smartphone 1 starts monitoring acceleration of the subject apparatus when the user is walking or stopping. Then, the smartphone 1 issues an alert notification to the user on condition that the monitored acceleration exceeds average walking acceleration of the user of the subject apparatus. Therefore, according to one embodiment of the above, unexpected behavior of the user such as sudden running can be recognized as behavior having high probability of inducing a traffic accident, and an alert notification therefor can be issued. With this, notification performed by the electronic apparatus can be improved.

In one embodiment of the above, the smartphone 1 may execute the processing of determining whether behavior of the user has high probability of inducing a traffic accident if the current location of the user or the current time satisfies predetermined conditions, for example. Embodiments of such a case will be described below.

Figure 4:
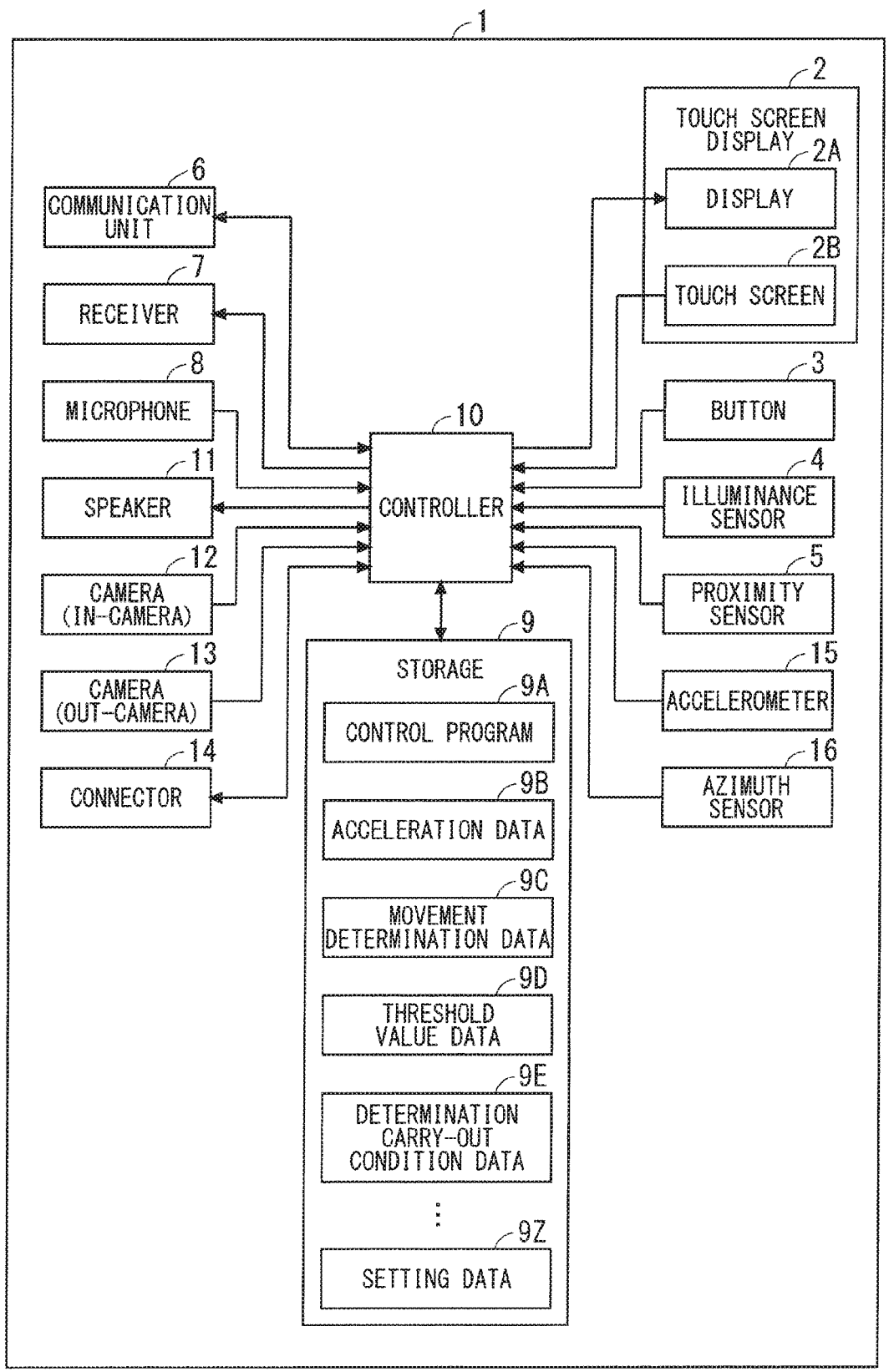
FIG. 4 illustrates a block diagram showing one example of a functional configuration of the smartphone.

FIG. 4 illustrates a block diagram showing one example of a functional configuration of the smartphone 1 according to other embodiments. The functional configuration of the smartphone 1 illustrated in FIG. 4 is different from the functional configuration of the smartphone 1 illustrated in FIG. 1 in respect of matters described below.

The storage 9 can further store determination carry-out condition data 9E. The determination carry-out condition data 9E corresponds to data that records determination carry-out conditions, on which determination whether behavior of the user of the subject apparatus is behavior having high probability of inducing a traffic accident is carried out. The determination carry-out condition data 9E includes information of an area where traffic volume exceeds a threshold value, and information of school-commuting hours for the user.

The control program 9A can provide a function of determining whether behavior of the user is behavior having high probability of inducing a traffic accident on condition that at least one of the current location of the user of the subject apparatus or the current time satisfies the determination carry-out conditions. Specifically, the control program 9A can determine the current location of the user based on signals acquired from a GPS receiver (not shown), or based on information of a radio base station acquired via the communication unit 6. The control program 9A can determine the current time based on an internal clock (not shown). If the control program 9A determines the current location of the user, the control program 9A can determine whether the determined current location of the user satisfies the determination carry-out conditions. i.e., whether the determined current location of the user is located within an area where traffic volume exceeds a threshold value. If the control program 9A determines the current time, the control program 9A can determine whether the determined current time satisfies the determination carry-out conditions, i.e., whether the determined current time is within school-commuting hours for the user. If at least one of the determined current location and the determined current time satisfies the determination carry-out conditions, the control program 9A can determine whether behavior of the user is behavior having high probability of inducing a traffic accident in a manner similar to that in one embodiment described above.

Through execution of the control program 9A, the controller 10 can implement a function of determining whether behavior of the user is behavior having high probability of inducing a traffic accident on condition that at least one of the current location of the user of the subject apparatus or the current time satisfies the determination carry-out conditions.

Figure 5:
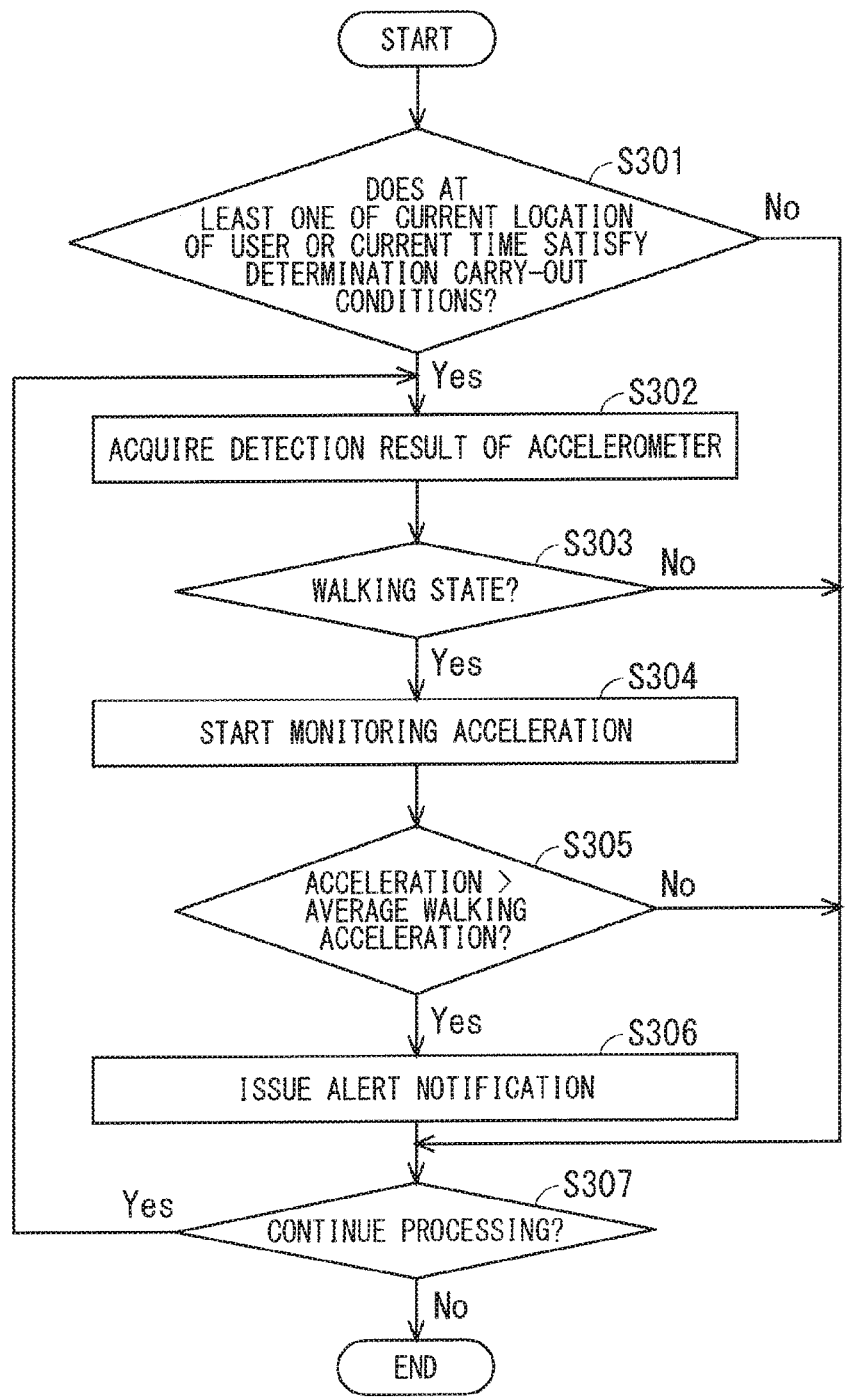
FIG. 5 illustrates a flowchart showing one example of a flow of processing executed by the smartphone.
Figure 6:
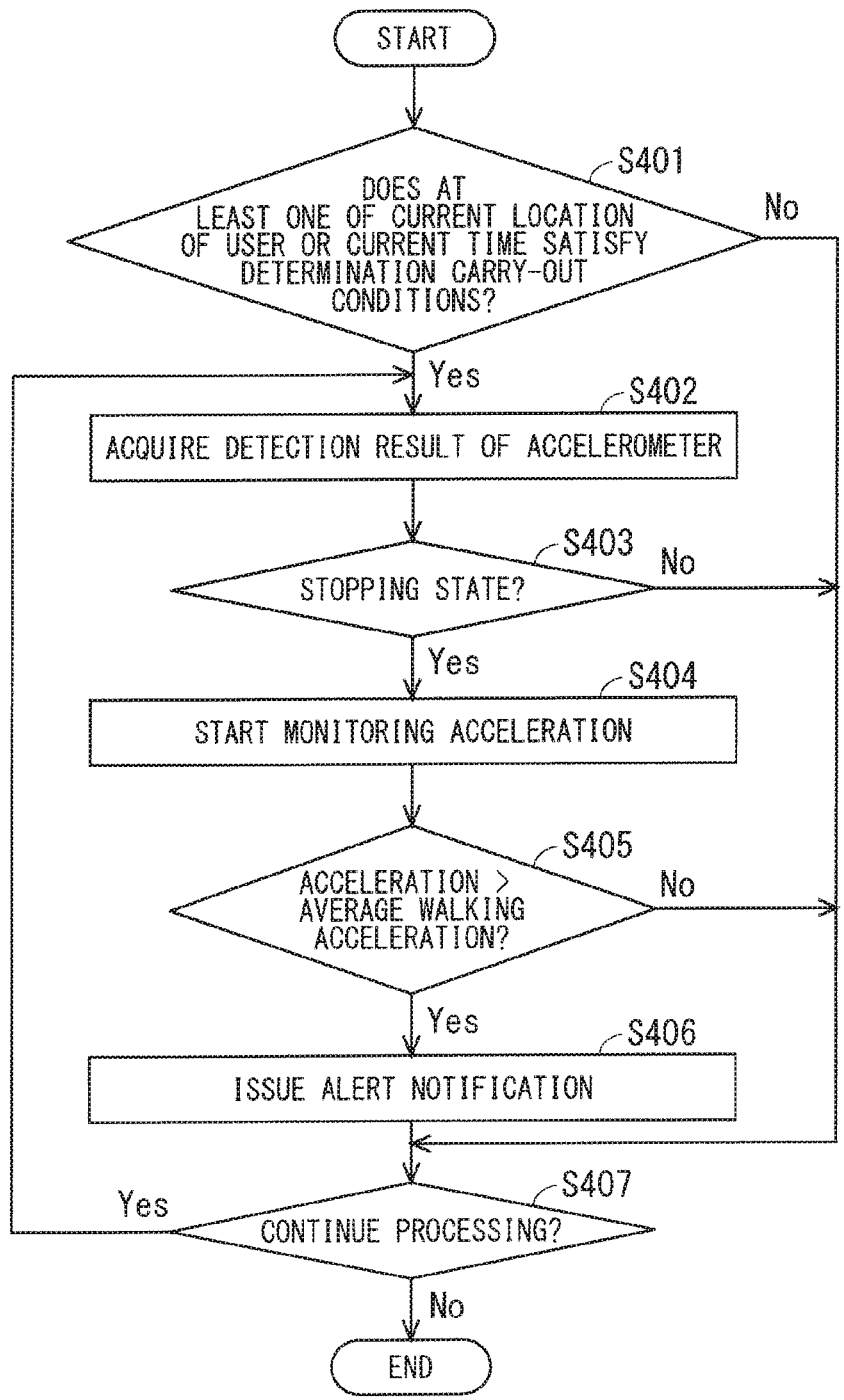
FIG. 6 illustrates a flowchart showing one example of a flow of processing executed by the smartphone.

Referring to FIG. 5 and FIG. 6, a flow of processing of the smartphone 1 according to other embodiments will be described. FIG. 5 and FIG. 6 each illustrate a flowchart showing one example of a flow of processing executed by the smartphone according to other embodiments. The processing illustrated in FIG. 5 and FIG. 6 is implemented by the controller 10 executing the control program 9A stored in the storage 9.

Referring to FIG. 5, description will be given of one example. Specifically, on condition that at least one of the current location of the user and the current time satisfies the determination carry-out conditions, acceleration is acquired to determine whether the user is walking. If the user is walking, acceleration that affects the subject apparatus starts to be monitored to determine whether the monitored acceleration exceeds average walking acceleration. Thus, whether behavior of the user has high probability of inducing a traffic accident is determined.

As illustrated in FIG. 5, the controller 10 determines whether at least one of the current location of the user and the current time satisfies the determination carry-out conditions (Step S301).

If at least one of the current location of the user and the current time satisfies the determination carry-out conditions as a result of the determination (Step S301, Yes), the controller 10 acquires a detection result of the accelerometer 15 (Step S302).

Subsequently, the controller 10 determines whether the user of the smartphone 1 is walking based on the detection result of the accelerometer 15 (Step S303).

If the user is walking as a result of the determination (Step S303. Yes), the controller 10 starts monitoring the acceleration as the detection result of the accelerometer 15 (Step S304).

Subsequently, the controller 10 determines whether the monitored acceleration exceeds average walking acceleration of the user of the subject apparatus (Step S305).

If the monitored acceleration exceeds the average walking acceleration as a result of the determination (Step S305, Yes), the controller 10 issues an alert notification to the user of the subject apparatus (Step S306).

Subsequently, the controller 10 determines whether to continue the processing (Step S307).

If the processing is to be continued as a result of the determination (Step S307. Yes), the controller 10 returns to the processing procedure of Step S302 above. In contrast, if the processing is not to be continued as a result of the determination (Step S307, No), the controller 10 ends the processing illustrated in FIG. 5.

If the monitored acceleration does not exceed the average walking acceleration as a result of the determination in Step S305 above (Step S305, No), the controller 10 proceeds to the determination of Step S307 above.

If the user is not walking as a result of the determination in Step S303 above (Step S303, No), the controller 10 proceeds to the determination of Step S307 above.

If both of the current location of the user and the current time do not satisfy the determination carry-out conditions as a result of the determination in Step S301 above (Step S301, No), the controller 10 proceeds to the determination of Step S307 above.

Referring to FIG. 6, description will be given of one example. Specifically, on condition that at least one of the current location of the user and the current time satisfies the determination carry-out conditions, acceleration is acquired to determine whether the user is stopping. If the user is stopping, acceleration that affects the subject apparatus starts to be monitored to determine whether the monitored acceleration exceeds average walking acceleration. Thus, whether behavior of the user has high probability of inducing a traffic accident is determined.

As illustrated in FIG. 6, the controller 10 determines whether at least one of the current location of the user and the current time satisfies the determination carry-out conditions (Step S401).

If at least one of the current location of the user and the current time satisfies the determination carry-out conditions as a result of the determination (Step S401. Yes), the controller 10 acquires a detection result of the accelerometer 15 (Step S402).

Subsequently, the controller 10 determines whether the user of the smartphone 1 is stopping based on the detection result of the accelerometer 15 (Step S403).

If the user is stopping as a result of the determination (Step S403. Yes), the controller 10 starts monitoring the acceleration as the detection result of the accelerometer 15 (Step S404).

Subsequently, the controller 10 determines whether the monitored acceleration exceeds average walking acceleration of the user of the subject apparatus (Step S405).

If the monitored acceleration exceeds the average walking acceleration as a result of the determination (Step S405, Yes), the controller 10 issues an alert notification to the user of the subject apparatus (Step S406).

Subsequently, the controller 10 determines whether to continue the processing (Step S407).

If the processing is to be continued as a result of the determination (Step S407, Yes), the controller 10 returns to the processing procedure of Step S402 above. In contrast, if the processing is not to be continued as a result of the determination (Step S407, No), the controller 10 ends the processing illustrated in FIG. 6.

If the monitored acceleration does not exceed the average walking acceleration as a result of the determination in Step S405 above (Step S405, No), the controller 10 proceeds to the determination of Step S407 above.

If the user is not stopping as a result of the determination in Step S403 above (Step S403, No), the controller 10 proceeds to the determination of Step S407 above.

If both of the current location of the user and the current time do not satisfy the determination carry-out conditions as a result of the determination in Step S401 above (Step S401, No), the controller 10 proceeds to the determination of Step S407 above.

The smartphone 1 may regularly access a cloud storage server and download the latest data about determination carry-out conditions via the communication unit 6 such that the determination carry-out condition data 9E stored in the storage 9 is kept updated. The determination carry-out condition data 9E may include, as the determination carry-out conditions, information other than the information of an area where traffic volume exceeds a threshold value and the information of school-commuting hours for the user. For example, the determination carry-out condition data 9E may include information of an area where the number of traffic accidents happened exceeds a predetermined number, information of an area where exhaust gas concentration exceeds a predetermined proportion, and information of an area where the number of times of sudden driving operation in a vehicle, such as sudden braking and sudden steering, exceeds a predetermined threshold value.

In one embodiment of the above, the smartphone 1 may carry out the determination whether behavior of the user has high probability of inducing a traffic accident in accordance with an outside request. One example of embodiments of such a case will be described below.

On condition of receiving a determination carry-out request via the communication unit 6, the control program 9A can determine whether behavior of the user has high probability of inducing a traffic accident in a manner similar to that in one embodiment described above. The determination carry-out request can be sent and received by using various formats, such as Short Message Service (SMS), Multimedia Message Service (MMS), and email.

Through execution of the control program 9A, the controller 10 can implement the processing of determining whether behavior of the user has high probability of inducing a traffic accident in a manner similar to that in one embodiment described above on condition of receiving a determination carry-out request via the communication unit 6.

Figure 7:
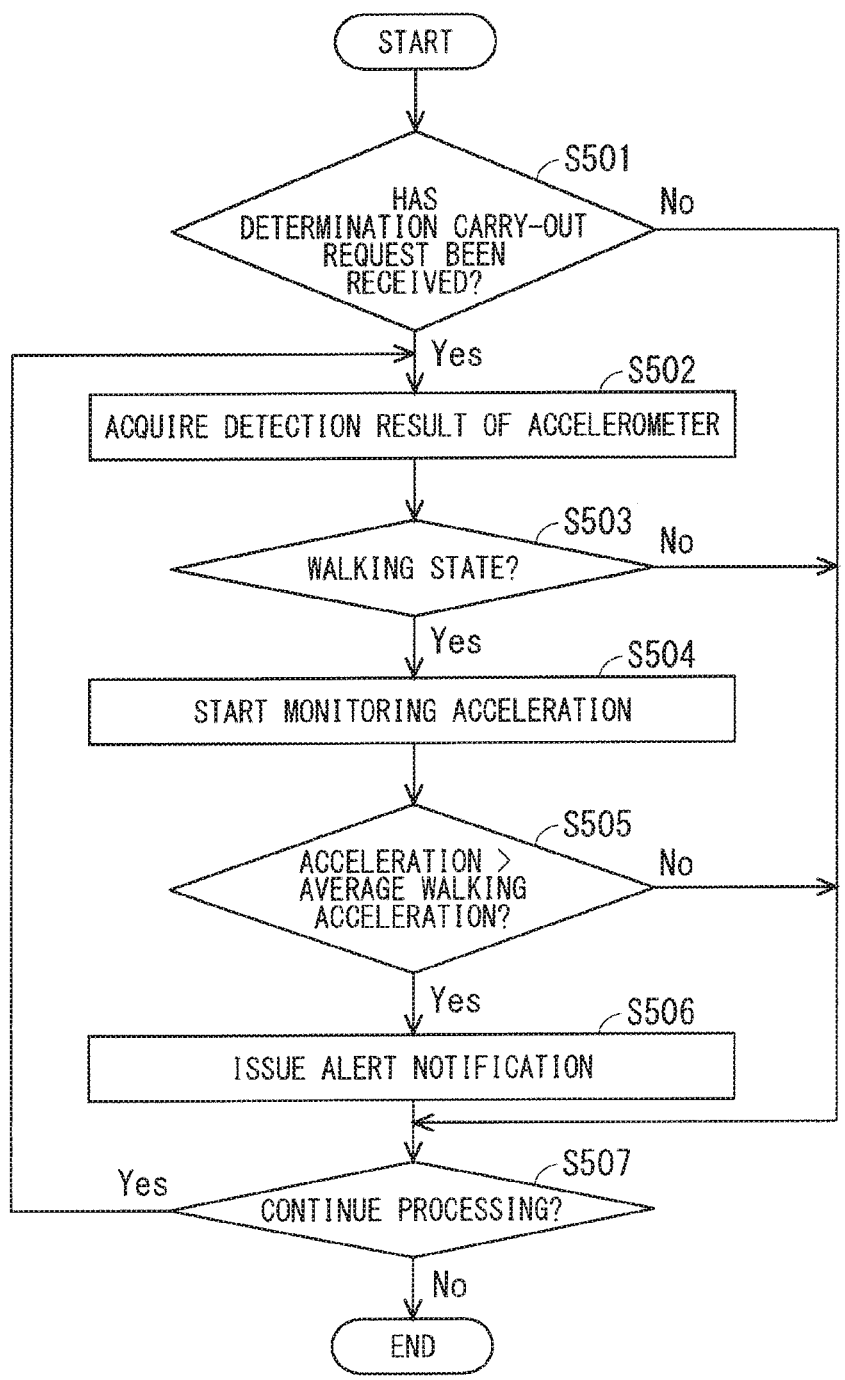
FIG. 7 illustrates a flowchart showing one example of a flow of processing executed by the smartphone.
Figure 8:
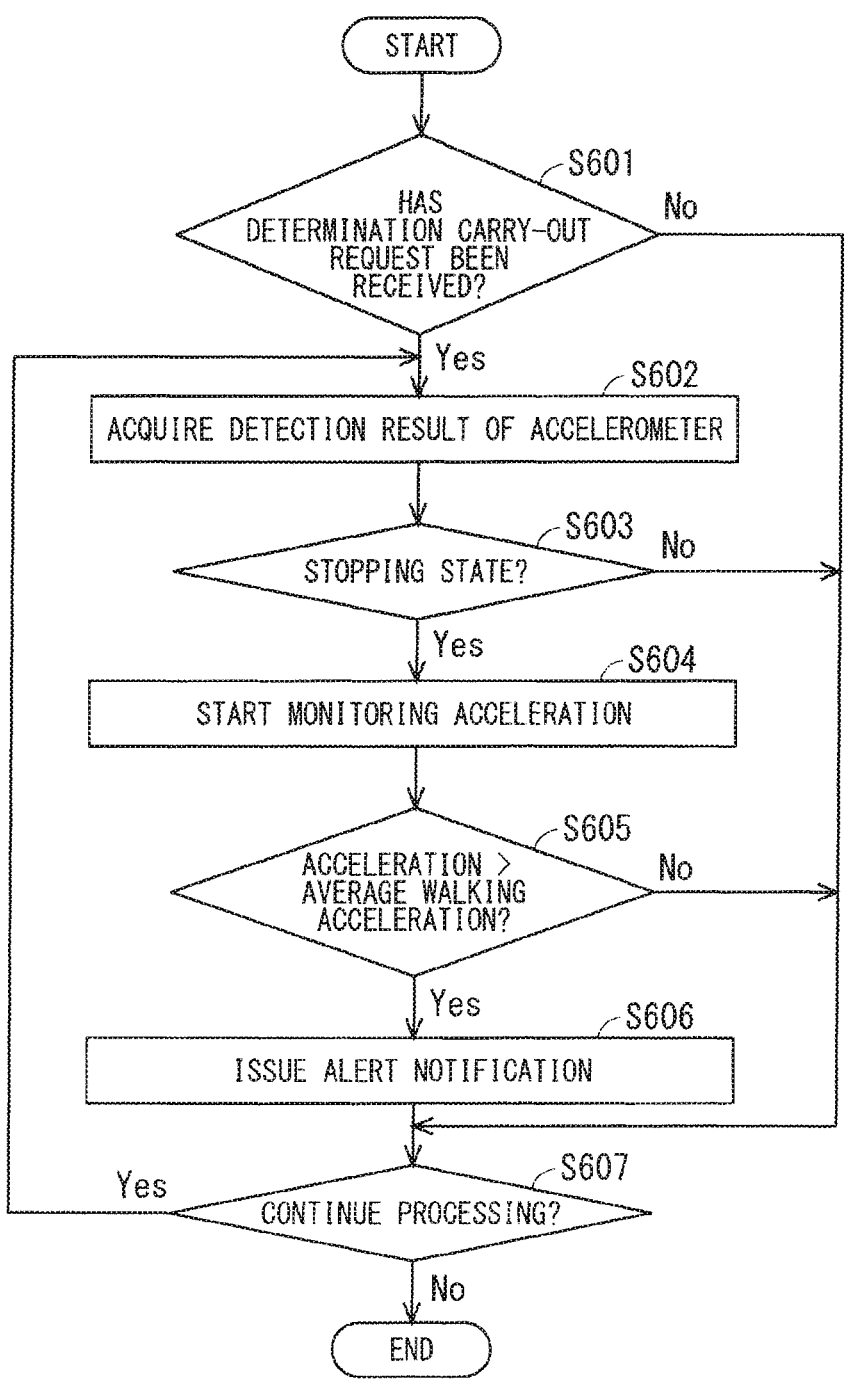
FIG. 8 illustrates a flowchart showing one example of a flow of processing executed by the smartphone.

Referring to FIG. 7 and FIG. 8, a flow of processing of the smartphone 1 according to other embodiments will be described. FIG. 7 and FIG. 8 each illustrate a flowchart showing one example of a flow of processing executed by the smartphone according to other embodiments. The processing illustrated in FIG. 7 and FIG. 8 is implemented by the controller 10 executing the control program 9A stored in the storage 9.

Referring to FIG. 7, description will be given of one example. Specifically, on condition of reception of a determination carry-out request, whether the user is walking is determined. If the user is walking, acceleration that affects the subject apparatus starts to be monitored to determine whether the monitored acceleration exceeds average walking acceleration. Thus, whether behavior of the user has high probability of inducing a traffic accident is determined.

As illustrated in FIG. 7, the controller 10 determines whether a determination carry-out request has been received (Step S501).

If a determination carry-out request has been received as a result of the determination (Step S501, Yes), the controller 10 acquires a detection result of the accelerometer 15 (Step S502).

Subsequently, the controller 10 determines whether the user of the smartphone 1 is walking based on the detection result of the accelerometer 15 (Step S503).

If the user is walking as a result of the determination (Step S503, Yes), the controller 10 starts monitoring the acceleration as the detection result of the accelerometer 15 (Step S504).

Subsequently, the controller 10 determines whether the monitored acceleration exceeds average walking acceleration of the user of the subject apparatus (Step S505).

If the monitored acceleration exceeds the average walking acceleration as a result of the determination (Step S505, Yes), the controller 10 issues an alert notification to the user of the subject apparatus (Step S506).

Subsequently, the controller 10 determines whether to continue the processing (Step S507).

If the processing is to be continued as a result of the determination (Step S507. Yes), the controller 10 returns to the processing procedure of Step S502 above. In contrast, if the processing is not to be continued as a result of the determination (Step S507, No), the controller 10 ends the processing illustrated in FIG. 7.

If the monitored acceleration does not exceed the average walking acceleration as a result of the determination in Step S505 above (Step S505, No), the controller 10 proceeds to the determination of Step S507 above.

If the user is not walking as a result of the determination in Step S503 above (Step S503, No), the controller 10 proceeds to the determination of Step S507 above.

If no determination carry-out request has been received in Step S501 above (Step S501, No), the controller 10 proceeds to the determination of Step S507 above.

Referring to FIG. 8, description will be given of one example. Specifically, on condition of reception of a determination carry-out request, whether the user is stopping is determined. If the user is stopping, acceleration that affects the subject apparatus starts to be monitored to determine whether the monitored acceleration exceeds average walking acceleration. Thus, whether behavior of the user has high probability of inducing a traffic accident is determined.

As illustrated in FIG. 8, the controller 10 determines whether a determination carry-out request has been received (Step S601).

If a determination carry-out request has been received as a result of the determination (Step S601, Yes), the controller 10 acquires a detection result of the accelerometer 15 (Step S602).

Subsequently, the controller 10 determines whether the user of the smartphone 1 is stopping based on the detection result of the accelerometer 15 (Step S603).

If the user is stopping as a result of the determination (Step S603, Yes), the controller 10 starts monitoring the acceleration as the detection result of the accelerometer 15 (Step S604).

Subsequently, the controller 10 determines whether the monitored acceleration exceeds average walking acceleration of the user of the subject apparatus (Step S605).

If the monitored acceleration exceeds the average walking acceleration as a result of the determination (Step S605, Yes), the controller 10 issues an alert notification to the user of the subject apparatus (Step S606).

Subsequently, the controller 10 determines whether to continue the processing (Step S607).

If the processing is to be continued as a result of the determination (Step S607, Yes), the controller 10 returns to the processing procedure of Step S602 above. In contrast, if the processing is not to be continued as a result of the determination (Step S607, No), the controller 10 ends the processing illustrated in FIG. 8.

If the monitored acceleration does not exceed the average walking acceleration as a result of the determination in Step S605 above (Step S605, No), the controller 10 proceeds to the determination of Step S607 above.

If the user is not stopping as a result of the determination in Step S603 above (Step S603, No), the controller 10 proceeds to the determination of Step S607 above.

If no determination carry-out request has been received in Step S601 above (Step S601, No), the controller 10 proceeds to the determination of Step S607 above.

The smartphone 1 may execute the above processing illustrated in FIG. 7 and FIG. 8 only if a determination carry-out request has been received from a specific device. For example, the smartphone 1 may register an email address of a specific device in advance, and may execute the processing of determining whether behavior of the user has high probability of inducing a traffic accident if an email address of a sender of the incoming determination carry-out request received via email matches the registered email address. One conceivable case is that the user of the smartphone 1 is a student and the user of a specific device is a parent of the student.

In one embodiment of the above, description has been given of one example where the smartphone 1 uses a detection result of its built-in accelerometer 15 for the processing of determining whether behavior of the user has high probability of inducing a traffic accident. Not only limited to such an example, the smartphone 1 may execute the processing of determining whether behavior of the user has high probability of inducing a traffic accident by using a sensing result of a wearable terminal worn by the user of the subject apparatus, for example. Embodiments of such a case will be described below.

Figure 9:
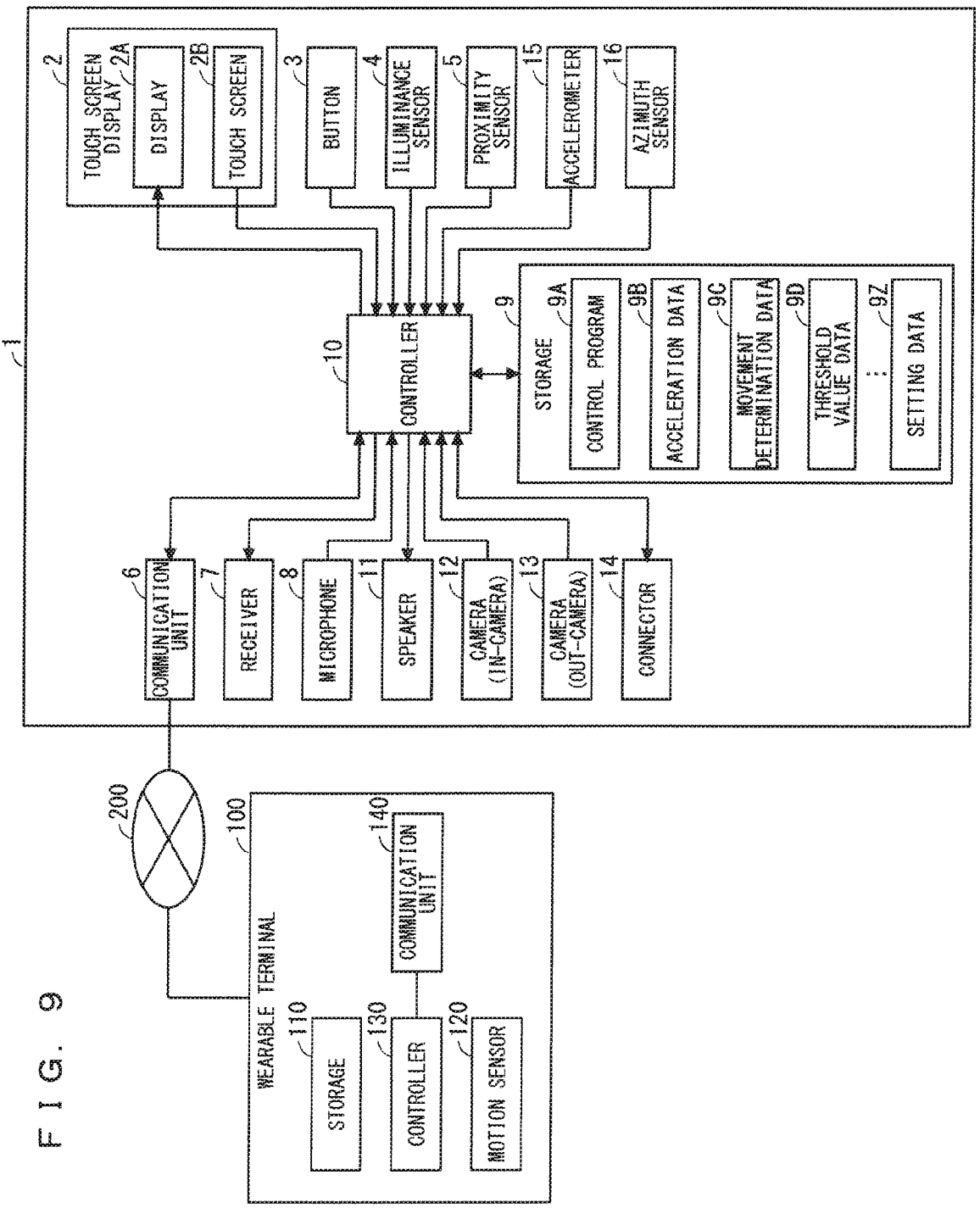
FIG. 9 illustrates a block diagram showing one example of a functional configuration of the smartphone.

FIG. 9 illustrates a block diagram showing one example of a functional configuration of the smartphone 1 according to other embodiments. The functional configuration of the smartphone 1 illustrated in FIG. 9 is different from the functional configuration of the smartphone 1 illustrated in FIG. 1 in respect of matters described below.

A wearable terminal 100 is communicatively coupled to the smartphone 1 via a network 200. Examples of the wearable device 100 include devices of various wearing types, such as a wristwatch type, an eyeglass type, a shoe type, a hairband type, a key type, a necklace type, a collar type, a finger ring type, a bracelet type, a bag type, and a clothing type.

The wearable terminal 100 comprises a storage 110, a motion sensor 120, a controller 130, and a communication unit 140.

The storage 110 can store a program and data used for processing executed by the controller 130.

The motion sensor 120 can measure data for determining motion of the user who wears the wearable terminal 100. The motion sensor 120 may be formed as a sensor unit comprising at least one of a load sensor, an accelerometer, a gyro sensor, and a myoelectric sensor. If the wearable terminal 100 is a terminal of a bracelet type, for example, the motion sensor 120 may be formed as a sensor unit that consists of two sensors, namely, an accelerometer and a gyro sensor.

The controller 130 comprises at least one processor for providing control and processing capability to implement various functions as described in detail below.

In accordance with various embodiments, the at least one processor may be implemented as a single integrated circuit (IC) or as multiple communicatively coupled integrated circuits and/or discrete circuits. It is appreciated that the at least one processor can be implemented in accordance with various known technologies.

In one embodiment, the processor comprises one or more circuits or units configurable to perform one or more data computing procedures or processes by executing instructions stored in an associated memory, for example. In other embodiments, the processor may be implemented as firmware (e.g. discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The controller 130 can control motion of the wearable terminal 100 by using the program and data stored in the storage 110. In one embodiment, the controller 130 can send a detection result (measurement data) of the motion sensor 120 to the smartphone 1 via the communication unit 140.

The communication unit 140 can control sending and receiving of various pieces of data exchanged with the smartphone 1 via the network 200. The network 200 includes a wireless network using a standard for short-range wireless communication, such as Bluetooth (trademark) and IEEE802.11.

The control program 9A can acquire a detection result of the motion sensor 120 of the wearable terminal 100, and can determine whether the user of the subject apparatus is walking by comparing the detection result of the motion sensor 120 with the movement determination data 9C. If the control program 9A determines that the user is walking, the control program 9A can start monitoring the detection result of the motion sensor 120. If the monitored detection result of the motion sensor 120 exceeds a predetermined threshold value contained in the threshold value data 9D, the control program 9A can detect the monitored detection result as sudden behavioral change in the user, and can thereby determine that the behavior of the user is behavior having high probability of inducing a traffic accident. If the motion sensor 120 is formed as a sensor unit consisting of two sensors of an accelerometer and a gyro sensor, the control program 9A can use threshold values individually for acceleration and angular velocity as the predetermined threshold values. As the threshold value for acceleration, for example, average walking acceleration of the user can be adopted. As the threshold value for angular velocity, for example, average walking angular velocity of the user can be adopted.

Alternatively, the control program 9A can determine whether the user of the subject apparatus is stopping by comparing the detection result of the motion sensor 120 with the movement determination data 9C. If the control program 9A determines that the user is stopping, the control program 9A can start monitoring the detection result of the motion sensor 120. Further, similarly to the case of determining that the user is walking, if the monitored detection result of the motion sensor 120 exceeds a predetermined threshold value contained in the threshold value data 9D, the control program 9A can detect the monitored detection result as sudden behavioral change in the user, and can thereby determine that the behavior of the user is behavior having high probability of inducing a traffic accident.

If the control program 9A determines that the behavior of the user of the subject apparatus is behavior having high probability of inducing a traffic accident based on the detection result of the motion sensor 120, the control program 9A can provide a function of issuing an alert notification to the user.

The movement determination data 9C includes information of determination conditions that is used for determining a movement state of the user of the smartphone 1 based on the detection result of the motion sensor 120. The information of determination conditions includes at least information for determining, based on the detection result of the motion sensor 120, whether the user is walking or stopping.

Through execution of the control program 9A, the controller 10 can implement the processing of determining whether the user of the subject apparatus is walking by comparing the detection result of the motion sensor 120 with the movement determination data 9C. If the controller 10 determines that the user is walking, the controller 10 can implement the processing of starting monitoring the detection result of the motion sensor 120 through execution of the control program 9A. If the monitored detection result of the motion sensor 120 exceeds a predetermined threshold value contained in the threshold value data 9D, the controller 10 can, through execution of the control program 9A, detect the monitored detection result as sudden behavioral change in the user, and can thereby implement the processing of determining that the behavior of the user is behavior having high probability of inducing a traffic accident.

Alternatively, through execution of the control program 9A, the controller 10 can determine whether the user of the subject apparatus is stopping by comparing the detection result of the motion sensor 120 with the movement determination data 9C. If the controller 10 determines that the user is stopping, the controller 10 can start monitoring the detection result of the motion sensor 120 through execution of the control program 9A. Further, similarly to the case of determining that the user is walking, if the monitored detection result of the motion sensor 120 exceeds a predetermined threshold value contained in the threshold value data 9D, the controller 10 can determine that the behavior of the user is behavior having high probability of inducing a traffic accident through execution of the control program 9A.

If the controller 10 determines that the behavior of the user of the subject apparatus is behavior having high probability of inducing a traffic accident based on the detection result of the motion sensor 120, the controller 10 can issue an alert notification to the user.

Figure 10:
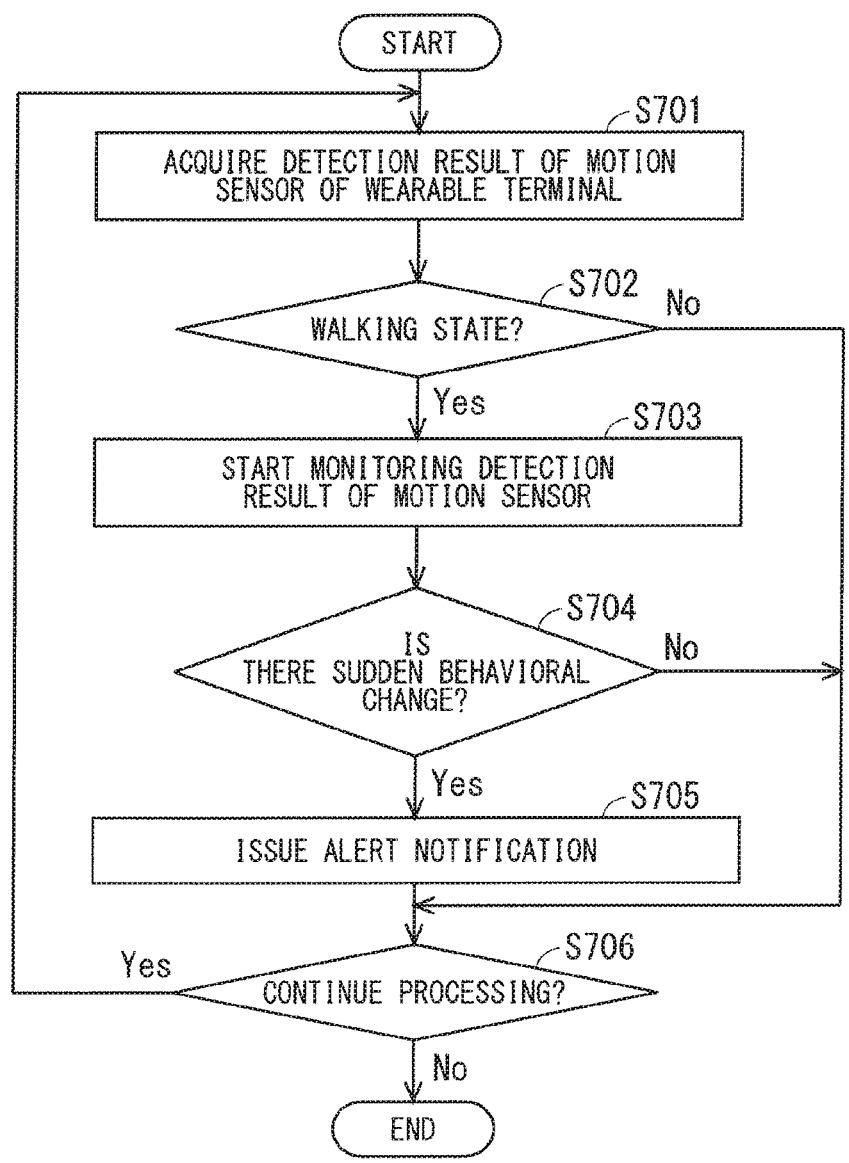
FIG. 10 illustrates a flowchart showing one example of a flow of processing executed by the smartphone.
Figure 11:
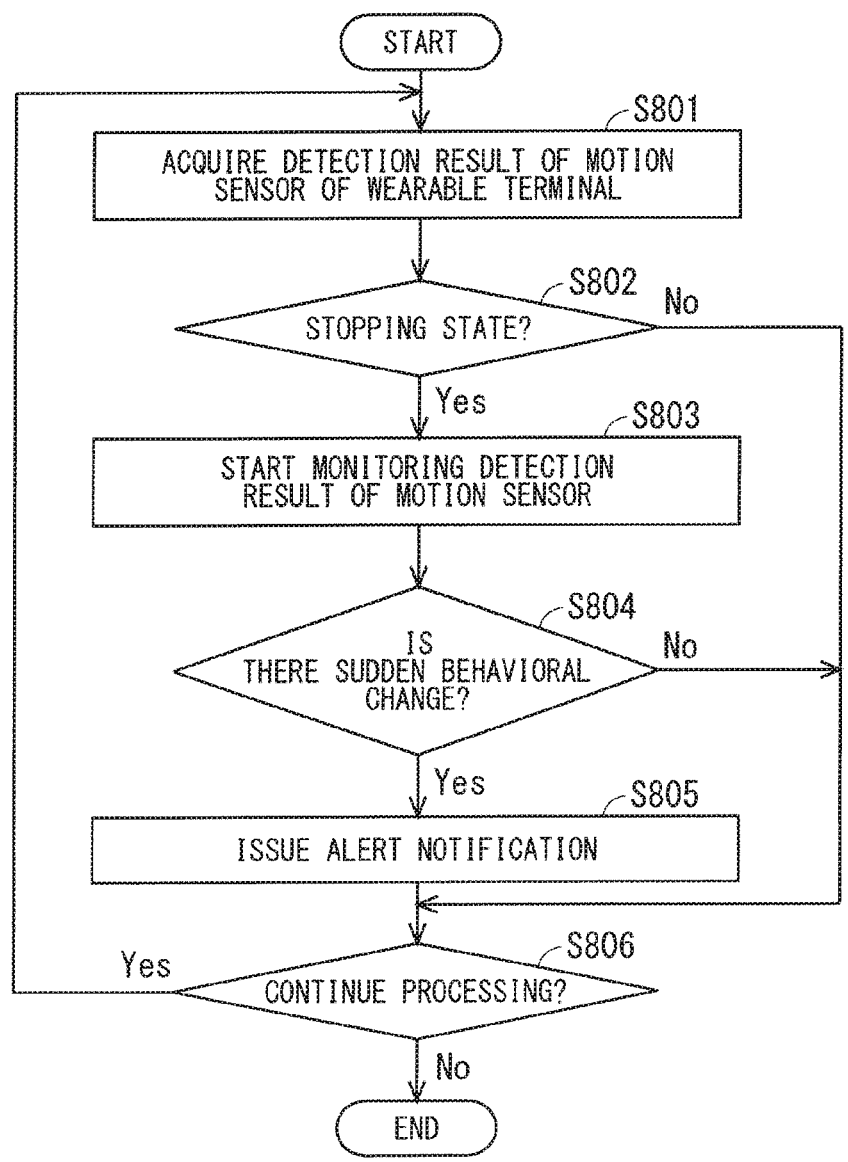
FIG. 11 illustrates a flowchart showing one example of a flow of processing executed by the smartphone.

Referring to FIG. 10 and FIG. 11, a flow of processing executed by the smartphone 1 according to other embodiments will be described. FIG. 10 and FIG. 11 each illustrate a flowchart showing one example of a flow of processing executed by the smartphone according to other embodiments. The processing illustrated in FIG. 10 and FIG. 11 is implemented by the controller 10 executing the control program 9A stored in the storage 9.

Referring to FIG. 10, description will be given of one example. Specifically, if the smartphone 1 determines that the user is walking based on a detection result of the motion sensor 120 of the wearable terminal 100, the smartphone 1 starts monitoring the detection result of the motion sensor 120. The smartphone 1 then detects sudden behavioral change in the user based on the monitored detection result of the motion sensor 120, and thereby determines whether behavior of the user has high probability of inducing a traffic accident.

As illustrated in FIG. 10, the controller 10 acquires a detection result of the motion sensor 120 of the wearable terminal 100 (Step S701).

Subsequently, the controller 10 determines whether the user of the smartphone 1 is walking based on the detection result of the motion sensor 120 (Step S702).

If the user is walking as a result of the determination (Step S702, Yes), the controller 10 starts monitoring the detection result of the motion sensor 120 (Step S703).

Subsequently, the controller 10 determines whether there was sudden behavioral change in the user based on the detection result of the motion sensor 120 (Step S704). If the detection result of the motion sensor 120 exceeds a predetermined threshold value that is contained in the threshold value data 9D, the controller 10 detects the detection result as sudden behavioral change in the user, and thereby determines that there was sudden behavioral change.

If there was sudden behavioral change in the user as a result of the determination (Step S704, Yes), the controller 10 issues an alert notification to the user of the subject apparatus (Step S705).

Subsequently, the controller 10 determines whether to continue the processing (Step S706).

If the processing is to be continued as a result of the determination (Step S706, Yes), the controller 10 returns to the processing procedure of Step S701 above. In contrast, if the processing is not to be continued as a result of the determination (Step S706, No), the controller 10 ends the processing illustrated in FIG. 10.

If there was no sudden behavioral change in the user as a result of the determination in Step S704 above (Step S704, No), the controller 10 proceeds to the processing procedure of Step S706 above.

If the user is not walking as a result of the determination in Step S702 above (Step S702, No), the controller 10 proceeds to the processing procedure of Step S706 above.

Referring to FIG. 11, description will be given of one example. Specifically, if the smartphone 1 determines that the user is stopping based on a detection result of the motion sensor 120 of the wearable terminal 100, the smartphone 1 starts monitoring the detection result of the motion sensor 120. The smartphone 1 then detects sudden behavioral change in the user based on the monitored detection result of the motion sensor 120, and thereby determines whether behavior of the user has high probability of inducing a traffic accident.

As illustrated in FIG. 11, the controller 10 acquires a detection result of the motion sensor 120 of the wearable terminal 100 (Step S801).

Subsequently, the controller 10 determines whether the user of the smartphone 1 is stopping based on the detection result of the motion sensor 120 (Step S802).

If the user is stopping as a result of the determination (Step S802, Yes), the controller 10 starts monitoring the detection result of the motion sensor 120 (Step S803).

Subsequently, the controller 10 determines whether there was sudden behavioral change in the user based on the detection result of the motion sensor 120 (Step S804). If the detection result of the motion sensor 120 exceeds a predetermined threshold value that is contained in the threshold value data 9D, the controller 10 detects the detection result as sudden behavioral change in the user, and thereby determines that there was sudden behavioral change.

If there was sudden behavioral change in the user as a result of the determination (Step S804, Yes), the controller 10 issues an alert notification to the user of the subject apparatus (Step S805).

Subsequently, the controller 10 determines whether to continue the processing (Step S806).

If the processing is to be continued as a result of the determination (Step S806, Yes), the controller 10 returns to the processing procedure of Step S801 above. In contrast, if the processing is not to be continued as a result of the determination (Step S806, No), the controller 10 ends the processing illustrated in FIG. 11.

If there was no sudden behavioral change in the user as a result of the determination in Step S804 above (Step S804, No), the controller 10 proceeds to the processing procedure of Step S806 above.

If the user is not stopping as a result of the determination in Step S802 above (Step S802, No), the controller 10 proceeds to the processing procedure of Step S806 above.

Description herein has been given of characteristic embodiments for the purpose of completely and clearly disclosing a technology relating to the attached claims. The attached claims, however, should not be limited to the above embodiments, but should be embodied by all of the modifications and alternative configurations that may be created by a person skilled in the art within the scope of basic matters described herein.

The invention claimed is:

1. An electronic apparatus comprising:
at least one processor configured to make a first determination based on an acceleration measured by an accelerometer, the first determination for determining whether behavior of a user of the electronic apparatus has a high probability of inducing a traffic accident;
the at least one processor configured to issue an alert notification to the user when the at least one processor determines that the behavior of the user has the high probability of inducing the traffic accident, wherein the at least one processor is configured to determine that the behavior of the user has the high probability of inducing the traffic accident when the measured acceleration exceeds a predetermined threshold value; and
the at least one processor further configured to make a second determination based on the acceleration measured by the accelerometer, the second determination for determining whether the user is walking; and
the at least one processor configured to, in a case that the at least one processor determines that the user is walking:
start monitoring the acceleration; and determine that the behavior of the user has the high probability of inducing the traffic accident when the monitored acceleration exceeds an average walking acceleration of the user.

2. The electronic apparatus according to claim 1, wherein the at least one processor is further configured to make a third determination based on the acceleration, the third determination for determining whether the user is stopping, wherein the at least one processor is configured to start monitoring the acceleration when the at least one processor determines that the user is stopping, and the at least one processor is configured to determine that the behavior of the user has the high probability of inducing the traffic accident when the monitored acceleration exceeds the predetermined threshold value.

3. The electronic apparatus according to claim 2, wherein the at least one processor determines that the behavior of the user has the high probability of inducing the traffic accident when the monitored accelerated exceeds the average walking acceleration of the user.

4. The electronic apparatus according to claim 1, further comprising a storage configured to store conditions for carrying out the first determination, wherein the at least one processor makes the first determination if at least one of a current location of the user and a current time satisfies the conditions.

5. The electronic apparatus according to claim 4, wherein the conditions comprise information of an area where traffic volume exceeds a threshold value, and information of school-commuting hours for the user.

6. The electronic apparatus according to claim 1, further comprising a communication unit configured to perform communication with another electronic apparatus, wherein the at least one processor makes the first determination if the at least one processor receives a request to carry out the first determination from the another electronic apparatus via the communication unit.

7. A control method executed by an electronic apparatus including storage, the control method comprising:

determining whether a current time is within a predetermined time stored in the storage; and in a case that the current time is within the predetermined time:

determining whether acceleration measured by an accelerometer exceeds a predetermined threshold value;

determining that behavior of a user of the electronic apparatus has a high probability of inducing a traffic accident when the acceleration exceeds the predetermined threshold value; and issuing an alert notification to the user if determination is made that the behavior has the high probability of inducing the traffic accident.

8. A non-transitory computer-readable recording medium storing a control program in an electronic apparatus including storage, to execute processes of:

in response to receiving at the electronic apparatus, from another electronic apparatus, a determination request for determining whether behavior of a user of the electronic apparatus has a high probability of inducing a traffic accident:

determining whether the another electronic apparatus is a predetermined electronic apparatus stored in the storage; and in response to determining that the another electronic apparatus is the predetermined electronic apparatus:

determining whether acceleration measured by an accelerometer exceeds a predetermined threshold value;

determining that behavior of the user has the high probability of inducing the traffic accident when the acceleration exceeds the predetermined threshold value; and issuing an alert notification to the user if determination is made that the behavior has the high probability of inducing the traffic accident.

9. The electronic apparatus according to claim 1, further comprising:

storage configured to store conditions for carrying out the first determination, the conditions comprising a predetermined time, wherein the at least one processor is configured to perform the first determination upon determining that a current time is within the predetermined time.

10. The electronic apparatus according to claim 1, further comprising:

storage configured to store identification information of a predetermined electronic apparatus; and the at least one processor configured to:

receive a request to carry out the first determination from another electronic apparatus;

determine whether the another electronic apparatus is the predetermined electronic apparatus; and perform the first determination in a case that the another electronic apparatus is the predetermined electronic apparatus.

* * * * *